United States Patent
Kubo et al.

(10) Patent No.: US 6,404,485 B1
(45) Date of Patent: Jun. 11, 2002

(54) ROTATION AMOUNT DETECTING SYSTEM OF DEFLECTION MIRROR FOR OPTICAL DISC DRIVE

(75) Inventors: Wataru Kubo, Saitama-ken; Suguru Takishima; Hirotaka Fujii, both of Tokyo, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/482,147

(22) Filed: Jan. 12, 2000

Related U.S. Application Data

(63) Continuation of application No. 09/177,566, filed on Oct. 23, 1998, now abandoned.

(30) Foreign Application Priority Data

Oct. 24, 1997 (JP) .............................................. 9-309858

(51) Int. Cl.$^7$ ................................................ G01B 11/26
(52) U.S. Cl. ...................... 356/138; 356/150; 356/154; 250/231.14
(58) Field of Search ................................. 356/138, 154, 356/150; 250/234, 236, 231.14

(56) References Cited

U.S. PATENT DOCUMENTS

| 2,750,461 A | 6/1956 | Bunch |
| 3,244,917 A | 4/1966 | Gute |

(List continued on next page.)

FOREIGN PATENT DOCUMENTS

| EP | 0084727 | 8/1983 |
| EP | 0084728 | 8/1983 |
| EP | 0448362 | 9/1991 |
| EP | 0790512 | 8/1997 |
| EP | 0907163 | 4/1999 |
| GB | 378922 | 8/1932 |
| GB | 1314002 | 4/1973 |
| GB | 1457995 | 12/1976 |
| GB | 2000604 | 1/1979 |
| GB | 2086092 | 5/1982 |
| GB | 2193341 | 2/1988 |
| JP | 62262017 | 11/1987 |
| JP | 64-2015 | 1/1989 |
| JP | 5128561 | 5/1993 |
| JP | 8315404 | 11/1996 |
| NL | 2 086 092 A | * 5/1982 |
| WO | 90/08363 | 7/1990 |
| WO | 98/06095 | 2/1998 |
| WO | 98/49675 | 11/1998 |
| WO | 98/49684 | 11/1998 |

OTHER PUBLICATIONS

Patent Abstracts of Japan, vol. 012, No. 140 (P–696), dated Apr. 18, 1988.
Patent Abstracts of Japan, vol. 017, No. 505 (P–1611), dated Sep. 10, 1993.

(List continued on next page.)

Primary Examiner—Frank G. Font
Assistant Examiner—Roy M. Punnoose
(74) Attorney, Agent, or Firm—Greenblum & Bernstein, P.L.C.

(57) ABSTRACT

Disclosed is a rotation amount detecting system for detecting a rotation amount of a deflection mirror, which is rotatable about an rotation axis, employed in an optical disc drive. The rotation amount detecting system is provided with a light emitting system that emits a light beam to the deflection mirror. The light beam has a line-like cross section extending in a direction perpendicular to the rotation axis. Further, a detecting system is provided to receive the beam reflected by the deflection mirror and determines the rotation amount of the deflection mirror in accordance with the received beam.

17 Claims, 14 Drawing Sheets

U.S. PATENT DOCUMENTS

| | | | |
|---|---|---|---|
| 3,354,833 A | 11/1967 | Laing | |
| 4,088,914 A | 5/1978 | Aoki | |
| 4,126,796 A | 11/1978 | Ito | |
| 4,206,379 A | 6/1980 | Owda | |
| 4,285,566 A | 8/1981 | Yamamoto | |
| 4,297,713 A | 10/1981 | Ichikawa et al. | |
| 4,351,596 A | 9/1982 | Ohniwa et al. | |
| 4,466,088 A * | 8/1984 | Trethewey | 369/46 |
| 4,891,998 A | 1/1990 | Tourville | |
| 4,959,824 A | 9/1990 | Ueda | |
| 4,968,876 A | 11/1990 | Iima | |
| 5,125,750 A | 6/1992 | Corle et al. | |
| 5,126,899 A | 6/1992 | Kanazawa | |
| 5,136,559 A | 8/1992 | Nakayama | |
| 5,151,890 A * | 9/1992 | Yonekubo | 369/44.11 |
| 5,220,550 A | 6/1993 | Nakayama | |
| 5,254,893 A | 10/1993 | Ide | |
| 5,365,504 A * | 11/1994 | Noguchi | 369/44.41 |
| 5,420,848 A | 5/1995 | Date et al. | |
| 5,422,872 A | 6/1995 | Hsu et al. | |
| 5,444,683 A | 8/1995 | Ishikawa | |
| 5,461,498 A | 10/1995 | Iwao | |
| 5,517,474 A | 5/1996 | Takamine | |
| 5,532,480 A | 7/1996 | Scofield | |
| 5,564,585 A | 10/1996 | Saitoh | |
| 5,596,446 A | 1/1997 | Plesko | |
| 5,608,280 A | 3/1997 | Tamemoto et al. | |
| 5,610,752 A | 3/1997 | Hayakawa | |
| 5,625,244 A | 4/1997 | Bradfield | |
| 5,684,762 A | 11/1997 | Kubo | |
| 5,705,868 A | 1/1998 | Cox et al. | |
| 5,719,834 A | 2/1998 | Futagawa et al. | |
| 5,764,613 A | 6/1998 | Yamamoto | |
| 5,768,241 A | 6/1998 | Kanazawa et al. | |
| 5,844,676 A | 12/1998 | Southam et al. | |
| 5,886,438 A | 3/1999 | Kawanishi | |
| 5,920,140 A * | 7/1999 | Nakagishi et al. | 359/198 |

OTHER PUBLICATIONS

An article entitled "Optical Magnetic Disk Device Of U.S. TeraStor Succeeds Tracking Control—Track Pitch Of 0.34 $\mu$m Realized Using Two–Stage Servo", which appeared at pp. 13 and 14 of the Japanese language magazine *Nikkei Electronics,* Sep. 22, 1997 (No. 699).

An article entitle "Trillions Of Bytes", by Eric Nee, which appeared in the Mar. 24, 1997 issue of Forbes magazine.

A screen capture of a page from TeraStor's website (dated Mar. 19, 1997) entitled "Architecture of TeraStor's Near–Field Technology".

An article entitled "In 1998, 10 GB Per Inch$^2$ Is Realized Using New Optical Recording Technology", appeared at pp. 148–151 of the Sep., 1997 Japanese language edition of Nikkei Byte magazine.

An article by B.D. Terris et al., entitled "Near–Field Optical Data Storage", Applied Physics Letters, vol. 68, pp. 141–143, Jan. 8, 1996.

\* cited by examiner

ROTATION AMOUNT DETECTING SYSTEM OF DEFLECTION MIRROR FOR OPTICAL DISC DRIVE

This is a continuation of U.S. patent application No. 09/177,566, filed Oct. 23, 1998 now abandoned, the contents of which are expressly incorporated by reference herein in its entirety.

BACKGROUND OF THE INVENTION

The present invention relates to a rotation amount detecting system of a deflection mirror for an optical disc drive to read/write data from/to an optical disc.

Recently, technology in the field of magneto-optical disc drives has been greatly improved such that a data recording density on a magneto-optical disc has reached in excess of 10 Gbits/inch$^2$.

In such an optical disc drive, an objective optical system is mounted on an arm which is movable in a transverse direction of tracks formed on an optical disc for rough tracking. Firstly, the rough tracking is performed to locate the optical head in the vicinity of the track. Then, the incident angle of a beam which is incident on the objective optical system is adjusted (i.e., a fine tracking is performed), with use of a galvano mirror or the like. During the fine tracking operation, the beam spot is accurately located on one of the tracks whose pitch is, for example, 0.34 $\mu$m. In order to control the galvano mirror to accurately perform the fine tracking, it is necessary to detect the amount of rotation of the galvano mirror. In particular, it is desirable that the rotation amount of the galvano mirror can be detected without being affected by a tilting error of the galvano mirror.

Specifically, in a disc drive described above, if the galvano mirror is rotated to a position out of a certain rotational range to adjust the position of the beam spot, optical performance of the disc drive may be significantly lowered. Thus, the rotation angle of the deflection mirror should be monitored and controlled so as not to exceed a predetermined rotational range.

SUMMARY OF THE INVENTION

It is therefore an object of the invention to provide an improved rotation amount detecting system with which the rotation amount of the deflection mirror can be detected accurately without being affected by a tilting error of the deflection mirror.

For an object, according to the invention, there is provided a rotation amount detecting system for detecting a rotation amount of a deflection mirror rotatable about an rotation axis employed in an optical disc drive, which is provided with a light emitting system that emits a light beam to the deflection mirror, the light beam having a line-like cross section extending in a direction perpendicular to the rotation axis, and a detecting system that receives the beam reflected by the deflection mirror and determines the rotation amount of the deflection mirror in accordance with the received beam.

Since the light beam incident on the deflection mirror has a line-like cross section extending in the direction perpendicular to the rotation axis of the deflection mirror, the rotation amount can be detected without being affected by a tilting error of the deflection mirror.

Optionally, the light emitting system may include a light source that emits a diverging light beam, and a lens system provided between the light source and the deflection mirror, the lens system having a power at least in a direction parallel to the rotation axis of the deflection mirror.

Preferably, the lens system may convert the diverging light beam into a parallel beam in a direction perpendicular to the rotation axis of the deflection mirror.

In particular, the detecting system may have a photo detector having at least two light receiving areas arranged in a direction where the received beam is deflected if the deflection mirror rotated and a second lens system provided between the deflection mirror and the photo detector. In this case, preferably, the reflected beam passed through the second lens system forms a substantially circular spot on the two light receiving areas.

It is possible that the detecting system detects the rotation amount of the deflection mirror based on a difference between amounts of light received by the at least two light receiving areas.

In particular case, the light source may have a light emitting diode, and the lens system comprises an anamorphic lens.

Alternatively, the light emitting system may include a light source that emits a parallel light beam, and a lens system provided between the light source and the deflection mirror, the lens system having a power at least in a direction parallel to the rotation axis of the deflection mirror.

In this case, the lens system may have a power only in the direction parallel to the rotation axis of the deflection mirror.

In particular case, the light emitting system may have a beam splitter that splits the light beam emitted by the light source of the optical disc drive into a first beam to be directed to the optical disc and a second beam to be directed to the lens system.

When the light source emits the parallel beam, the lens system may have a cylindrical lens.

Also in this case, a photo detector may have at least two light receiving areas arranged in a direction where the received beam is deflected if the deflection mirror rotated, and a second lens system provided between the deflection mirror and the photo detector. The second lens system may a power only in a direction parallel to the rotation axis of the deflection mirror.

Further, the detecting system may detect the rotation amount of the deflection mirror based on a difference between amounts of light received by the at least two light receiving areas.

Further optionally, the detecting system may detect an intensity of the light beam emitted by the light source in accordance with a sum of the amounts of light detected by the two light receiving areas.

DESCIPTION OF THE ACCOMPANYING DRAWINGS

DESCRIPTION OF THE EMBODIMENTS

Hereinafter, the invention will be described with reference to the accompanying drawings.

Firstly, an optical disc drive to which the each of the embodiments is applicable will be described.

Figure 1:
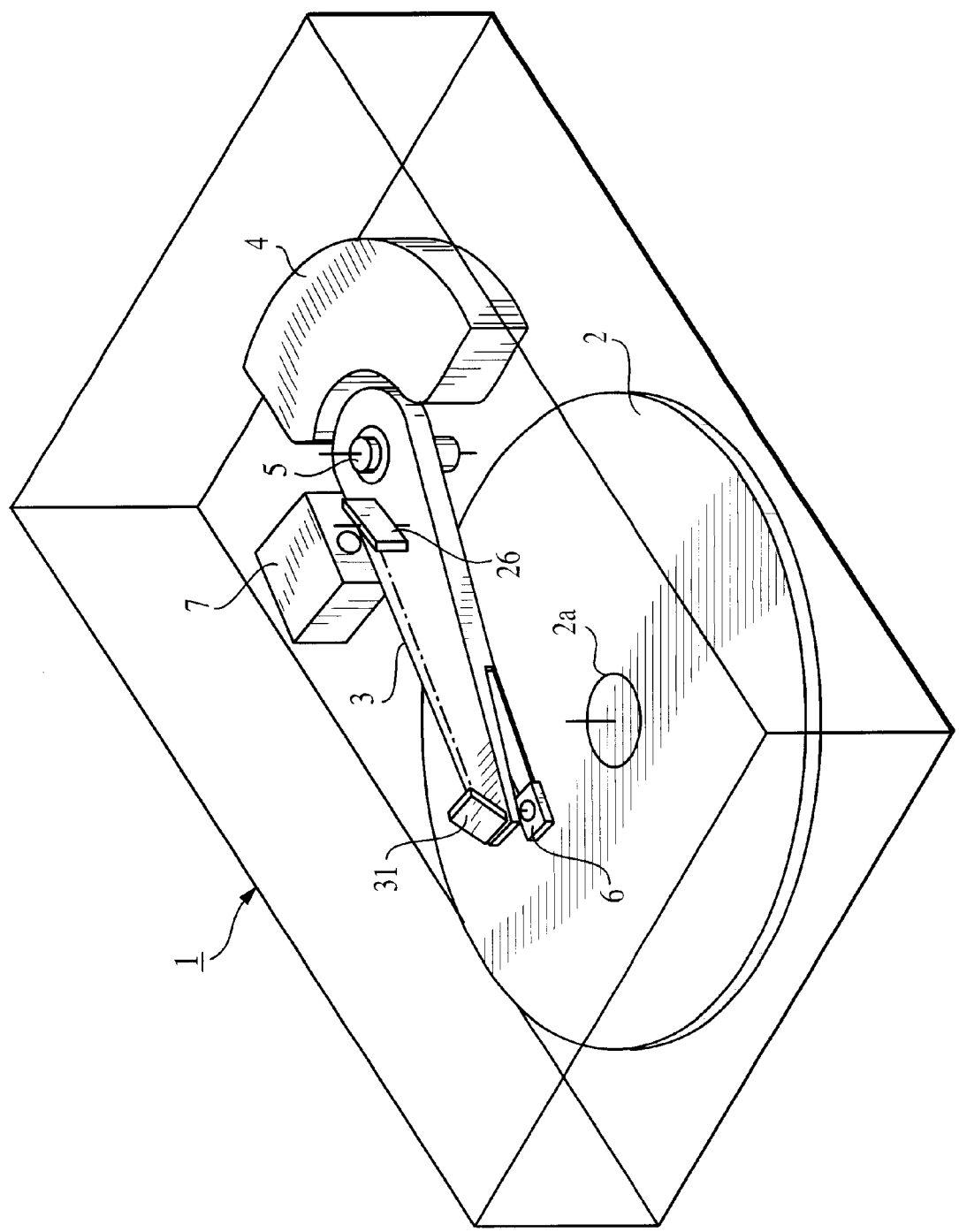
FIG. 1 is a perspective view of an optical disc drive to which first and the second embodiments of the present invention is embodied.

FIG. 1 is a perspective view of the optical disc drive (hereinafter, referred to as the disc drive) 1. The disc drive 1 is arranged to write and read data on an optical disc 2 by means of a so-called Near Field Recording (NFR) technology.

In the disc drive 1, the optical disc 2 is mounted to a rotating shaft 2a of a not-shown spindle motor. The disc drive 1 includes a rotary arm 3 extending in parallel to a surface of the optical disc 2, and is rotatably supported by a shaft 5. A floating head 6 that carries optical elements (described later) is provided to a tip of the rotary arm 3. When the rotary arm 3 is rotated, the floating head 6 moves across tracks formed on the optical disc 2. The rotary arm 3 is further provided with a light source module 7 in the vicinity of the shaft 5.

Figure 2:
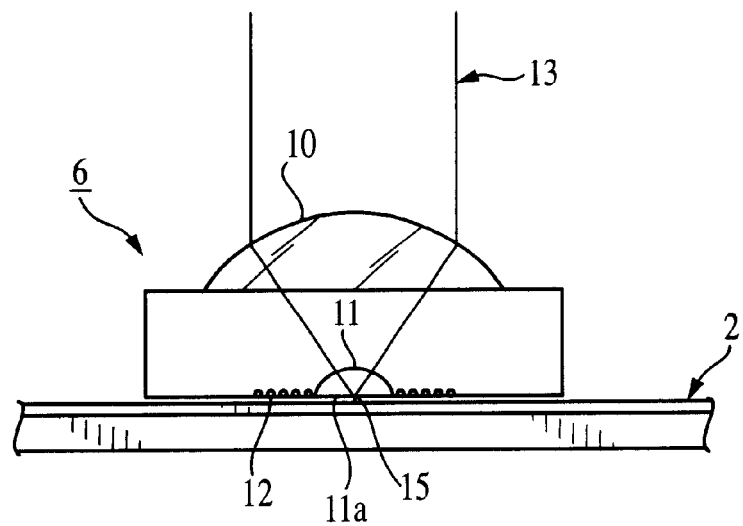
FIG. 2 is an enlarged view of a floating head of the optical disc drive of FIG. 1.
Figure 3:
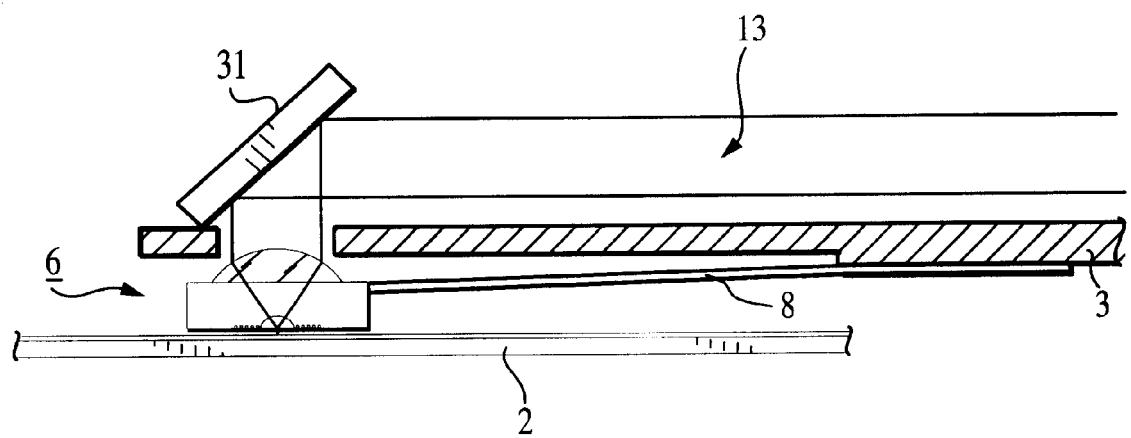
FIG. 3 is an enlarged view of the top of the rotary arm of the optical disc drive of FIG. 1.

FIG. 2 is an enlarged view of the floating head 6. FIG. 3 is an enlarged view of the tip of the rotary arm 3. As shown in FIG. 3, the floating head 6 is mounted to the rotary arm 3 via a flexure beam 8. One end of the flexure beam 8 is fixed to the bottom of the rotary arm 3, while the floating head 6 is fixed to the other end of the flexure beam 8. When the optical disc 2 rotates, the floating head 6 is lifted upward by air flow generated between the spinning optical disc 2 and the floating head 6. When the floating head 6 is lifted upward, the flexure beam 8 is elastically deformed, which urges the floating head 6 downward. With this, the floating amount of the floating head 6 is kept constant, due to the balance of the upward force (caused by the air flow) and the downward force (caused by the deformation of the flexure beam 8).

As shown in FIG. 2, the floating head 6 includes an objective lens 10 and a solid immersion lens (SIL) 11. A reflecting mirror 31 is provided to the rotary arm 3, which reflects the laser beam 13 emitted from the light source module 7 (FIG. 4) to the objective lens 10. The objective lens 10 converges the laser beam 13. The solid immersion lens 11 is a hemispherical lens and the plane surface thereof is faced with the optical disc 2. Further, the focal point of the objective lens 10 is positioned on the plane surface of the solid immersion lens 11. That is, the laser beam 13 is converged on the plane surface 11a of the solid immersion lens 11. Since the clearance of the optical disc and the plane surface 11a of the solid immersion lens 11 is less than 1 $\mu$m, the converged laser beam is converted to a so-called evanescent beam and reaches the optical disc 2. Since the beam diameter of the evanescent beam is smaller than the converged laser beam, a data storage capacity can be remarkably increased. Application of the solid immersion lens and the evanescent beam in a data recording device is disclosed in B. D. Terris, H. J. Manin, and D. Rugar, "Near-field optical data storage", Appl. Phys. Lett. 68, 141–143 (1996), and U.S. Pat. No. 5,125,750 issued on Jun. 30, 1992, teachings of which are incorporated by reference in their entireties.

In order to apply magnetic field on the surface of the optical disc 2, a coil 12 is provided around the solid immersion lens 11. A current flow in the coil 12 generates a magnetic field in which the optical disc 2 is positioned. Data writing is performed by the evanescent beam from the solid immersion lens 11 and the magnetic field generated by the coil 12.

Figure 4:
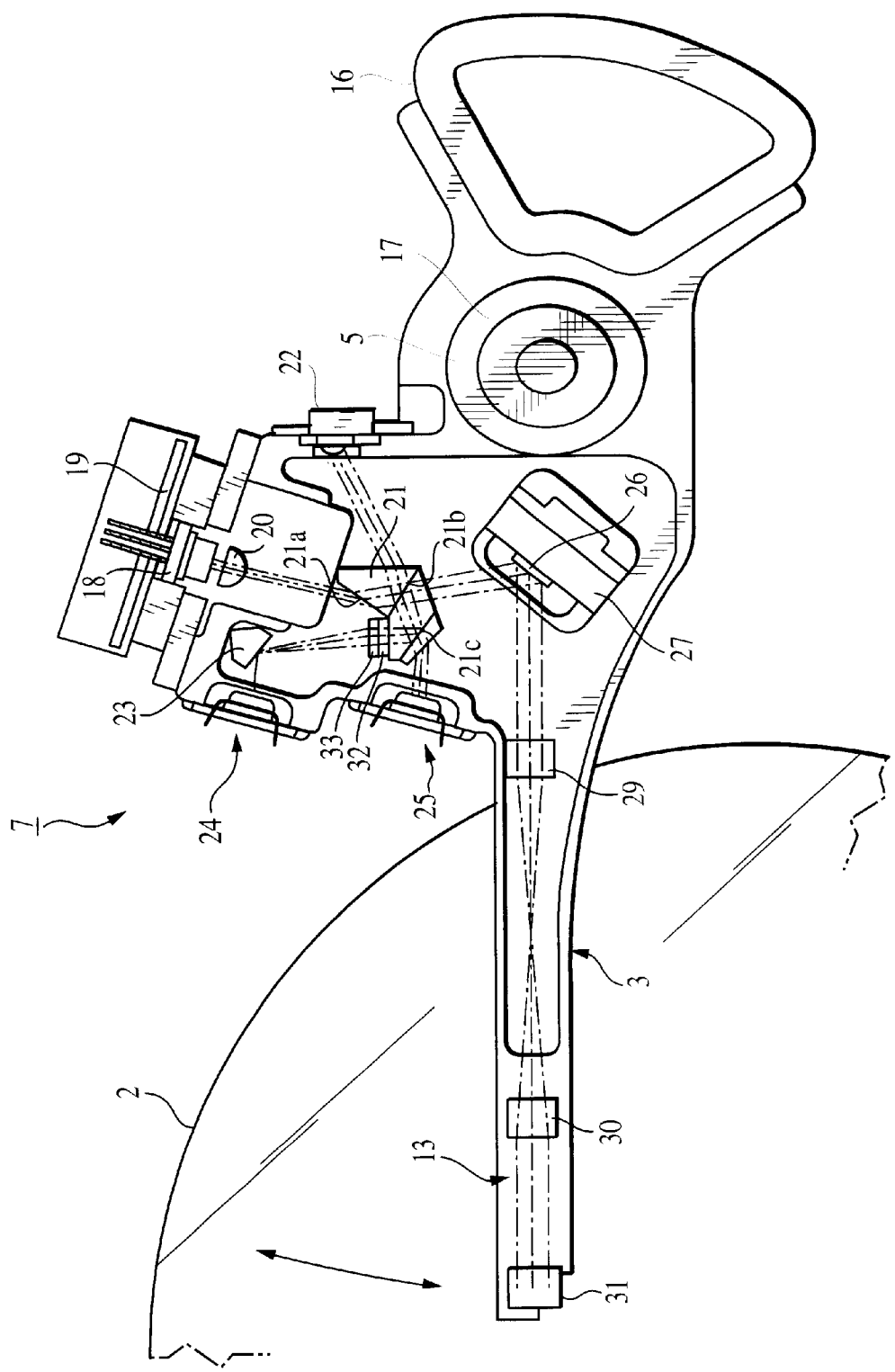
FIG. 4 is a top view of the rotary arm of the optical disc drive of FIG. 1.
Figure 5:
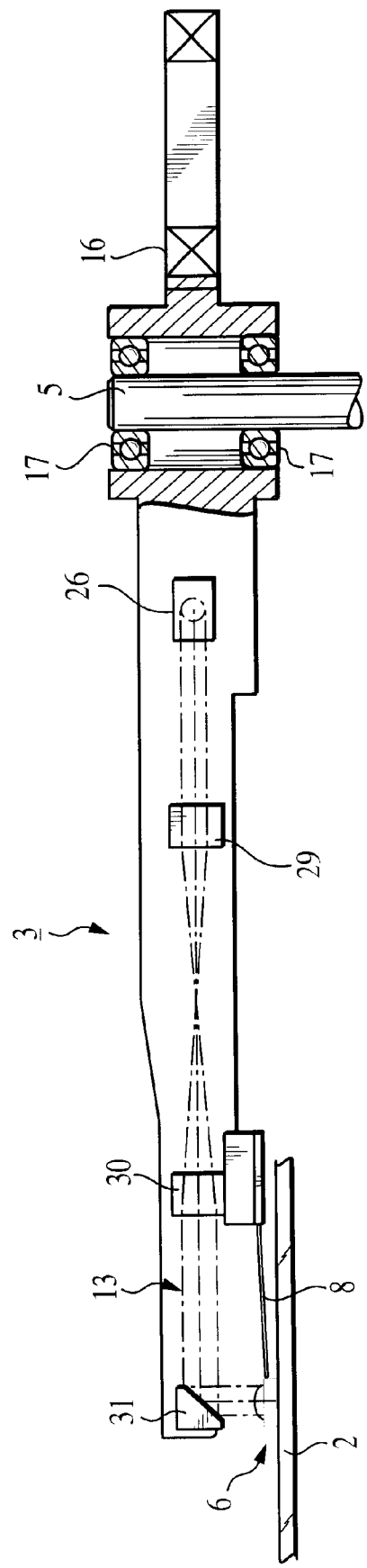
FIG. 5 is a longitudinal sectional view of the rotary arm of the optical disc drive of FIG. 1.

FIGS. 4 and 5 are a plan view and a sectional view of the rotary arm 3. As shown in FIGS. 4 and 5, the rotary arm 3 is provided with a driving coil 16 at the opposite end to the floating head 6. The driving coil 16 is inserted into a not shown magnetic circuit. The driving coil 16 and the magnetic circuit constitute a voice coil motor 4 (FIG. 1). The rotary arm 3 is supported by the shaft 5 via bearings 17. When current flows in the driving coil 16, the rotary arm 3 is rotated about the axis 5, due to the electromagnetic induction.

As shown in FIGS. 4 and 5, the light source module 7 includes a semiconductor laser 18, a laser drive circuit 19, a collimator lens 20 and a composite prism assembly 21. Further, the light source module 7 includes a laser power monitor sensor 22, a reflection prism 23, a data sensor 24 and a tracking detection sensor 25. A divergent laser beam emitted from the semiconductor laser 18 is converted to a parallel laser beam by the collimator lens 20. Due to the characteristics of the semiconductor laser 18, the sectional shape of the laser beam is elongated. In order to correct the sectional shape of the laser beam, an incident surface 21a of the composite prism assembly 21 is inclined with respect to the incident laser beam. When the laser beam is refracted by the incident surface 21a of the composite prism assembly 21, the sectional shape of the laser beam becomes a circle. The laser beam enters a first half mirror surface 21b. By the first half mirror surface 21b, the laser beam is partially lead to the laser power monitor sensor 22. The laser power monitor sensor 22 detects the intensity of the incident laser beam. The output from the laser power monitor sensor 22 is sent to a power control circuit (not shown) so as to stabilize the power of the semiconductor laser 18.

The tracking operation includes two steps: (1) a rough tracking and (2) a fine tracking. The rough tracking is accomplished by the rotation of the rotary arm 3. The fine tracking operation is accomplished by minutely moving the light spot on the optical disc 2. For this purpose, a galvano mirror 26 is provided in a light path between the light source module 7 and the objective lens 10. In particular, the galvano mirror 26 is located so that the laser beam 13 emitted from the light source module 7 directly enters therein. The laser beam 13 reflected by the galvano mirror 26 proceeds to the reflection mirror 31 and is reflected (by the reflection mirror 31) to the floating head 6. Then, the laser beam 13 is converged and incident on the optical disc 2. By rotating the galvano mirror 26, the incident angle of the laser beam 13 incident on the objective lens 10 is changed, so that the light spot on the optical disc 2 is moved. It should be noted that the rotation amount of the galvano mirror 26 is detected with use of a rotation amount detecting system, which is not shown in FIG. 4 and will be described as embodiments of the present invention later.

When the galvano mirror 26 rotates to change the incident angle of the laser beam 13 incident on the objective lens 10, there is a possibility that the laser beam 13 partially fails to enter the objective lens 10. In order to solve this problem, first and second relay lenses 29 and 30 are provided between the galvano mirror 26 and the objective lens 10 to obtain the conjugate relationship between a principal plane of the objective lens 10 and the center of the mirror surface of the galvano mirror 26 (in the vicinity of the rotation axis thereof). With this, the laser beam 13 reflected by the galvano mirror 26 is surely incident on the objective lens 10 irrespective of the rotation of the galvano mirror 26.

The laser beam 13 that has returned from the surface of the optical disc 2 travels through the floating head 6, the relay lenses 30 and 29 and the galvano mirror 26. Then, the laser beam 13 enters the composite prism assembly 21 and is reflected by the first half mirror surface 21b to the second half mirror surface 21c. The laser beam passed through the second half mirror surface 21c is directed to the tracking detection sensor 25. The tracking detection sensor 25 outputs a track error signal based on the incident laser beam. The laser beam that has reflected by the second half mirror surface 21c is split by a Wollaston polarizing prism 32, generating two polarized beams. The polarized beams are converged (by a converging lens 33) on the data detection sensor 24 via the reflection prism 23. The data detection sensor 24 has two light receiving portions which respectively receives two polarized beams. With this, the data detection sensor 24 reads data recorded on the optical disc 2. In particular, the data signal from the tracking detection sensor 25 and data detection sensor 24 are generated by a not-shown amplifier circuit and sent to a not-shown control circuit.

Hereinafter, the rotation amount detecting systems according to first to third embodiments of the present invention will be described.

As described above, the fine tracking is performed by rotating the galvano mirror 26. When the galvano mirror 26 is driven to rotate for fine tracking, it is important to detect the amount of rotation with respect to its reference position since the fine tracking is performed based on the rotational position of the galvano mirror 26 and the tracking error signal. In particular, it is preferable that the rotation angle of the galvano mirror 26 and a signal representing the rotational position of the galvano mirror 26 are proportional. If the change of the signal does not meet the change of the rotational position of the galvano mirror 26, or the signal has a hysterics characteristic, the fine tracking cannot be performed accurately since an accurate servo operation cannot be executed. Therefore, in order to accurately detect the rotation amount of the galvano mirror 26, a rotation amount detecting system 100 should be provided, which will be described hereinafter.

Figure 6:
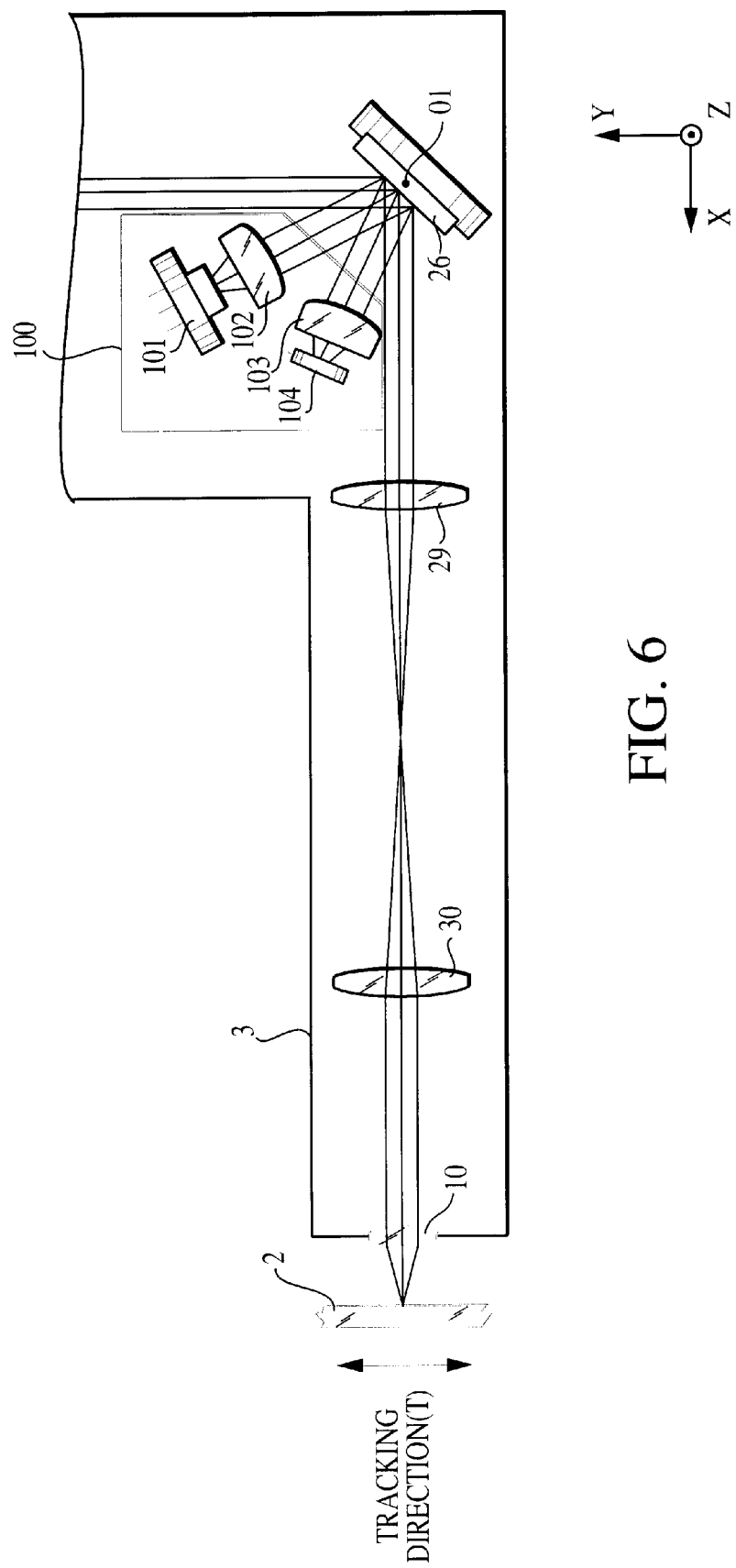
FIG. 6 shows a structure of a rotation amount detecting system according to a first embodiment of the invention.

FIG. 6 shows a schematic structure of the rotation amount detecting system 100 according to a first embodiment of the invention. The rotation amount detecting system 100 is applicable to the optical disc drive 1 described above. It should be noted that, in FIG. 6, the optical system is shown as developed, and the reflection mirror 31 and the solid immersion lens 11 are not shown in order to simplify the drawing and description thereof.

Figure 8:
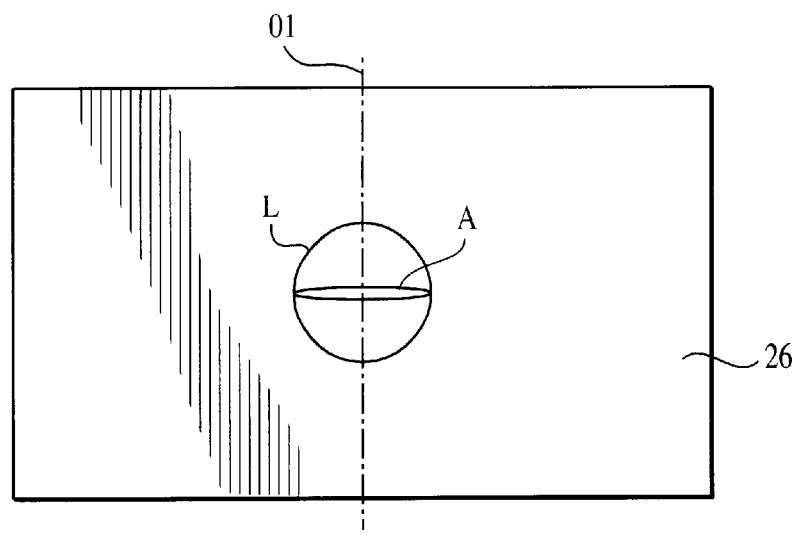
FIG. 8 shows beam spots formed on a galvano mirror.

The rotation amount detecting system 100 includes an LED (light emitting diode) 101, a first anamorphic lens (e.g., a toric lens) 102, a second anamorphic lens (e.g., a toric lens) 103, and a photo detector 104. The LED 101 emits a light beam having a substantially circular cross section. The light beam emitted by the LED 101 is incident on the first anamorphic lens 102. The first anamorphic lens is configured such that the beam emitted by the LED 101 is converged on the galvano mirror 26 in the Z axis direction, while the beam is converted into a parallel beam in a direction parallel to the X–Y plane. Thus, the light beam incident on the first anamorphic lens 102 is converged only in the Z direction, and directed to the reflection surface of the galvano mirror 26. As a result, on the galvano mirror 26, a line-like image extending in a direction parallel to the X–Y plane is formed as shown in FIG. 8. In FIG. 8, "A" denotes the line-like image formed by the light beam emitted by the LED 101 and passed through the first anamorphic lens 102, and "L" denotes the image formed by the light beam emitted by the laser diode 18, which is directed to the objective lens 10.

Figure 7A:
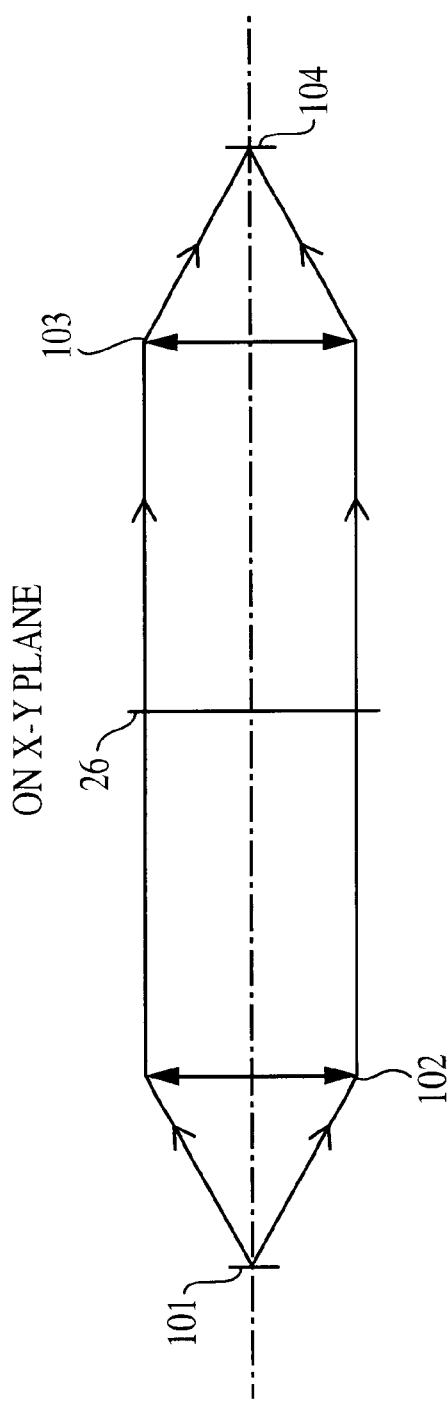
FIGS. 7A and 7B show optical path on an X–Y plane and a plane perpendicular to the X–Y plane.
Figure 7B:
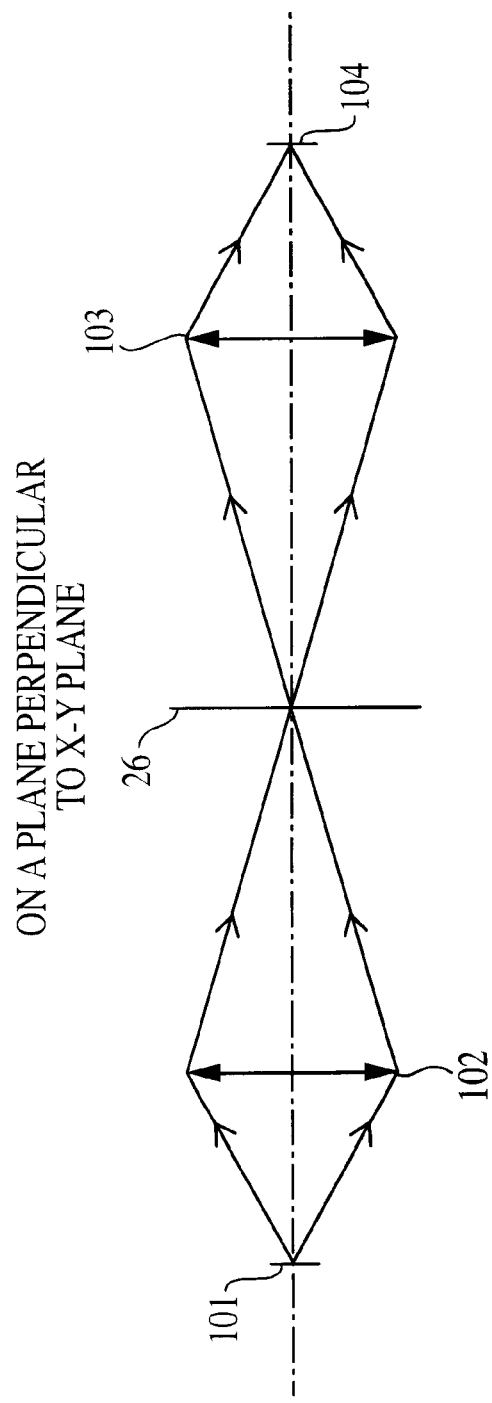

Since the light beams A and L are incident on the galvano mirror at different incident angles, the light beam A reflected by the galvano mirror 26 is directed towards the photo detector 104. Specifically, the reflected beam A is incident on the second anamorphic lens 103. The second anamorphic lens 103 is configured substantially similar to the first anamorphic lens 102. Thus, the LED 101 and the photo detector 104 have a conjugate relationship, and the beam A reflected by the galvano mirror is converged on the photo detector 104. FIGS. 7A and 7B illustrate the characteristics of the first and second anamorphic lens 103 and 104.

The rotation axis 01 of the galvano mirror 26 extends in the Z axis direction. As shown in FIG. 8, the line-like image formed by the beam A extends in the direction perpendicular to the rotation axis 01. Therefore, the rotation amount detecting system 100 has a sensitivity in the direction parallel to the X–Y plane, while the system 100 has little sensitivity in the Z axis direction. Thus, even if the rotation axis 01 is inclined with respect to the Z axis and/or the reflection surface of the galvano mirror 26 has a tilting error, the position of the beam spot formed on the photo detector 104 is not affected. In other words, the position of the beam spot formed on the photo detector 104 changes only by the change of the rotation angle of the galvano mirror 26.

Figure 9:
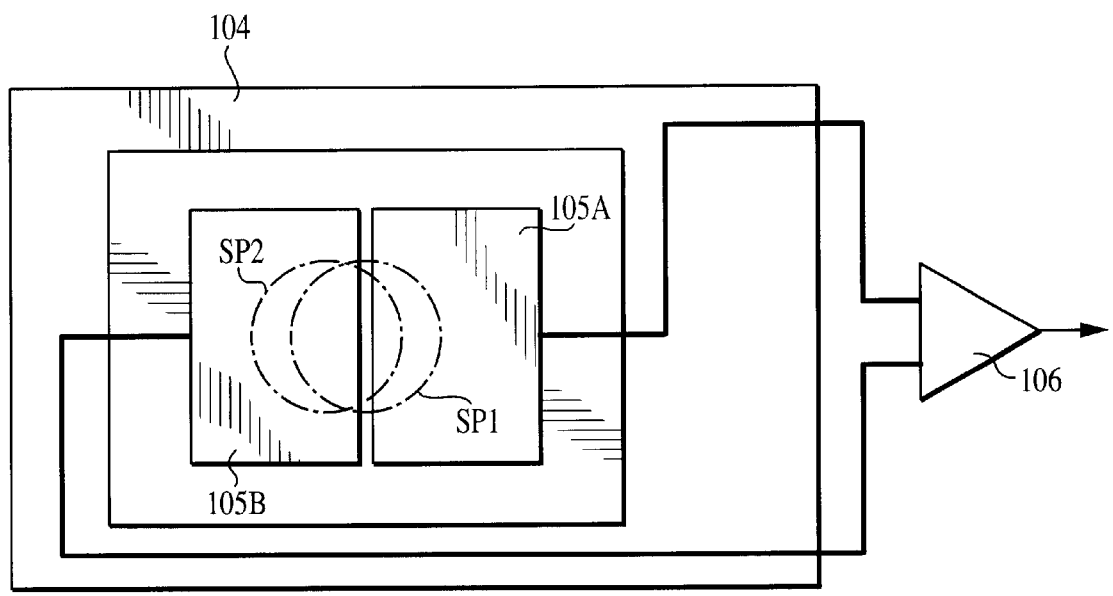
FIG. 9 is a plan view of a detector and a beam spot corresponding to a rotational position of the galvano mirror.

FIG. 9 shows circuit, including a front view of the photo detector 104, for obtaining a signal representative of the rotation amount of the galvano mirror 26. As described above, the light beam A is reflected on the reflection surface of the galvano mirror 26, incident on the second anamorphic lens 103, and then projected on the photo detector 104. The photodetector 104 has two light receiving areas 105A and 105B. The light receiving areas 105A and 105B are arranged in the direction parallel to the X–Y plane, i.e., in the direction in which the reflected light beam A is deflected when the galvano mirror 26 is rotated. Further, as shown in FIG. 9, the light receiving areas are arranged such that, when the galvano mirror 26 is located at is reference position (i.e., a position at which the incident angle of the beam from the laser diode 18 to the galvano mirror 26 is 45 degrees), the light receiving areas 105A and 105B receives the same amount of light. The beam spot in this condition is indicated in the drawing as a spot SP1. When the galvano mirror 26 is rotated, the beam spot moves in the direction parallel to the X–Y plane (i.e., in the direction where the two light receiving areas 105A and 105B are arranged). Thus, the light receiving areas 105A and 105B respectively receive different amounts of light. An example of a position of the beam spot in such a condition is indicated in FIG. 9 as a beam spot SP2. Since the rotation angle of the galvano mirror 26 is very small, the moving amount of the beam spot on the light receiving areas 105A and 105B can be considered to be proportional to the rotation amount (i.e., angle) of the galvano mirror 26.

The light receiving areas 105A and 105B are connected to a differential amplifier 106 which outputs a signal corresponding to a difference between the amounts of light received by the light receiving areas 105A and 105B. Thus, based on the output of the differential amplifier 106, the rotation amount of the galvano mirror 26 can be obtained.

Figure 16:
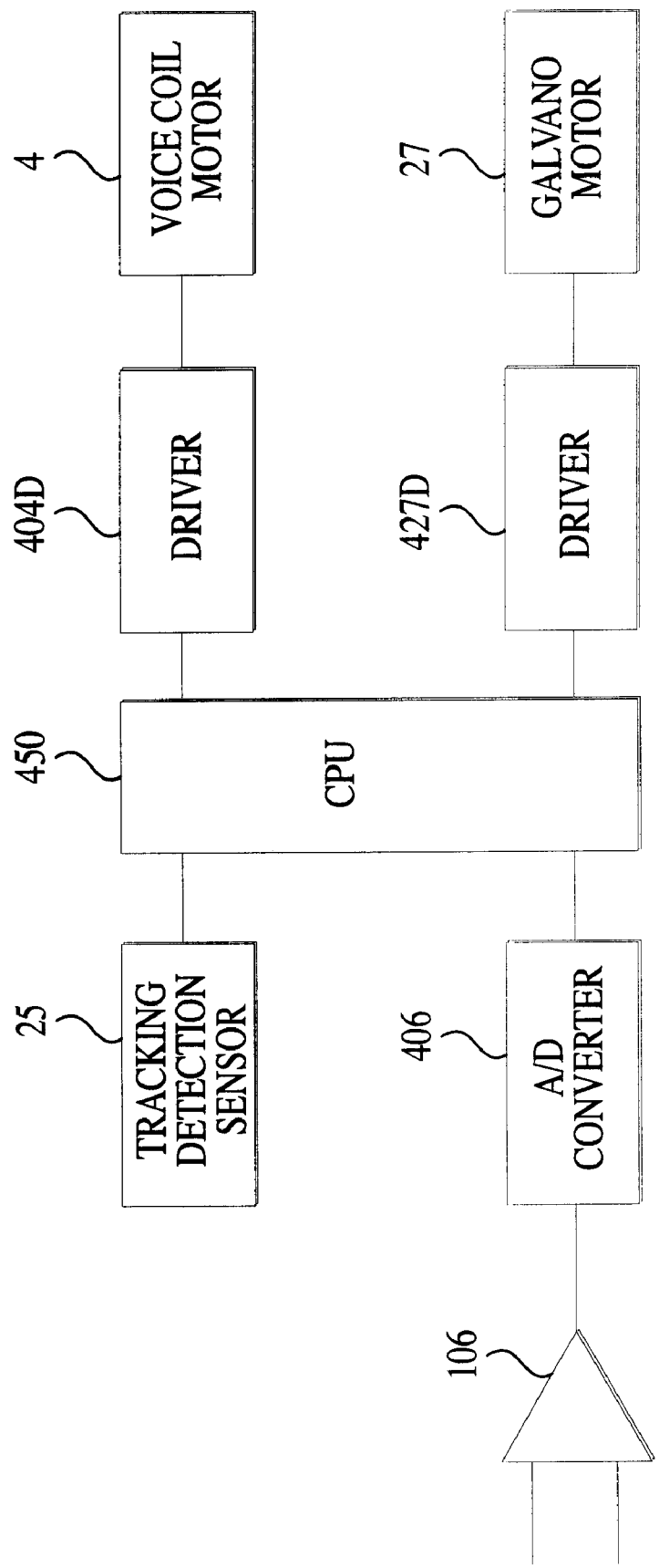
FIG. 16 is a block diagram illustrating a control system for performing a tracking operation.

FIG. 16 is a block diagram illustrating a control system for executing the tracking operation. As described above, the output signal of the differential amplifier 106 is transmitted, via the A/D converter 406, to the CPU 450, which detects the rotational position of the galvano mirror 26. Based on the detected rotational position of the galvano mirror 26 and the tracking error signal output by the tracking detection sensor 25, the CPU 450 calculates a resultant rotational position, which represents a rotational position of the galvano mirror 26 after it is rotated to adjust the position of the beam spot.

If the resultant rotational position is within a predetermined allowable rotation range, the CPU 450 controls a driver 427D of the galvano motor 27 to rotate the galvano mirror 26 such that the beam spot is directed on a desired one of the tracks of the optical disc 2 accurately. If the resultant rotational position of the galvano mirror 26 is out of the predetermined allowable rotation range, the CPU 450 converts the resultant rotational position into an amount of movement of the rotary arm 3, and controls a driver 404D of the voice coil motor 4 to rotate the rotary arm 3 instead of rotating the galvano mirror 26. As a result of movement of the rotary arm 3, the beam spot is located on the desired track and the galvano mirror 26 is located at the neutral position, i.e., a center of the allowable rotational range. Thereafter, if necessary, a further fine tracking operation for locating the beam spot accurately on the desired track may be executed.

As described above, according to the first embodiment, the beam having a line-like cross section extending in the direction perpendicular to the rotation axis of the galvano mirror 26, the rotation angle of the galvano mirror can be detected without being affected by the tilting error of the galvano mirror 26. Accordingly, the fine tracking operation can be performed at high accuracy.

[Second Embodiment]

Figure 10:
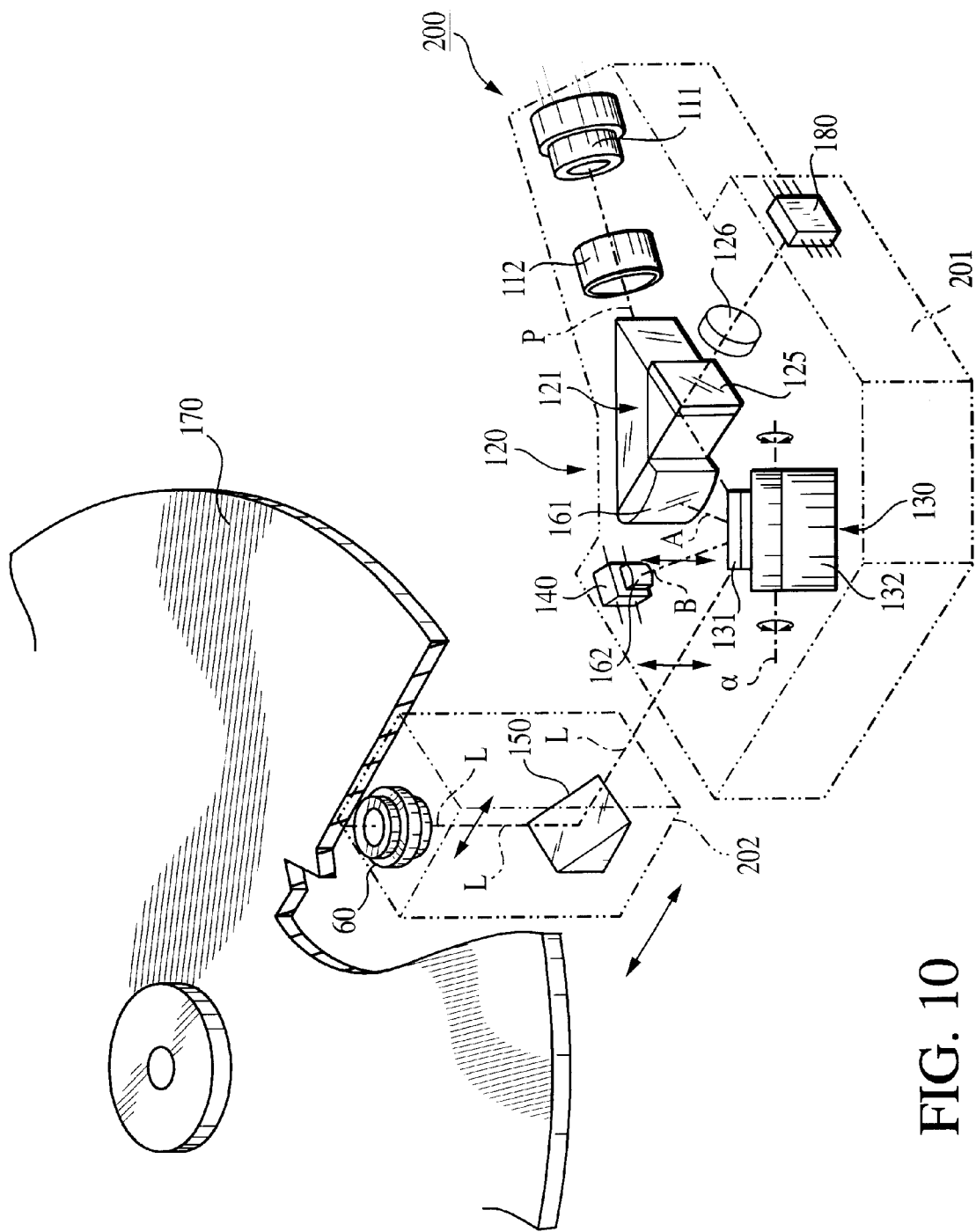
FIG. 10 is a perspective view of an optical system of an optical data recording/reproducing device according to a second embodiment of the invention.

FIG. 10 is a perspective view of an optical system 200 for an optical disc drive, according to a second embodiment of the invention.

The optical system 200 includes a stationary unit 201 and a movable unit 202. On the stationary unit 201, a laser diode 111, a collimator lens 112, a beam splitter 120, a deflection mirror unit 130 are mounted. On the movable unit 202, a reflection prism 150 and an objective lens 160 are provided. The movable unit 202 is constituted to be movable in a radial direction of an optical disc 170 by a driving unit (not shown).

Figure 11:
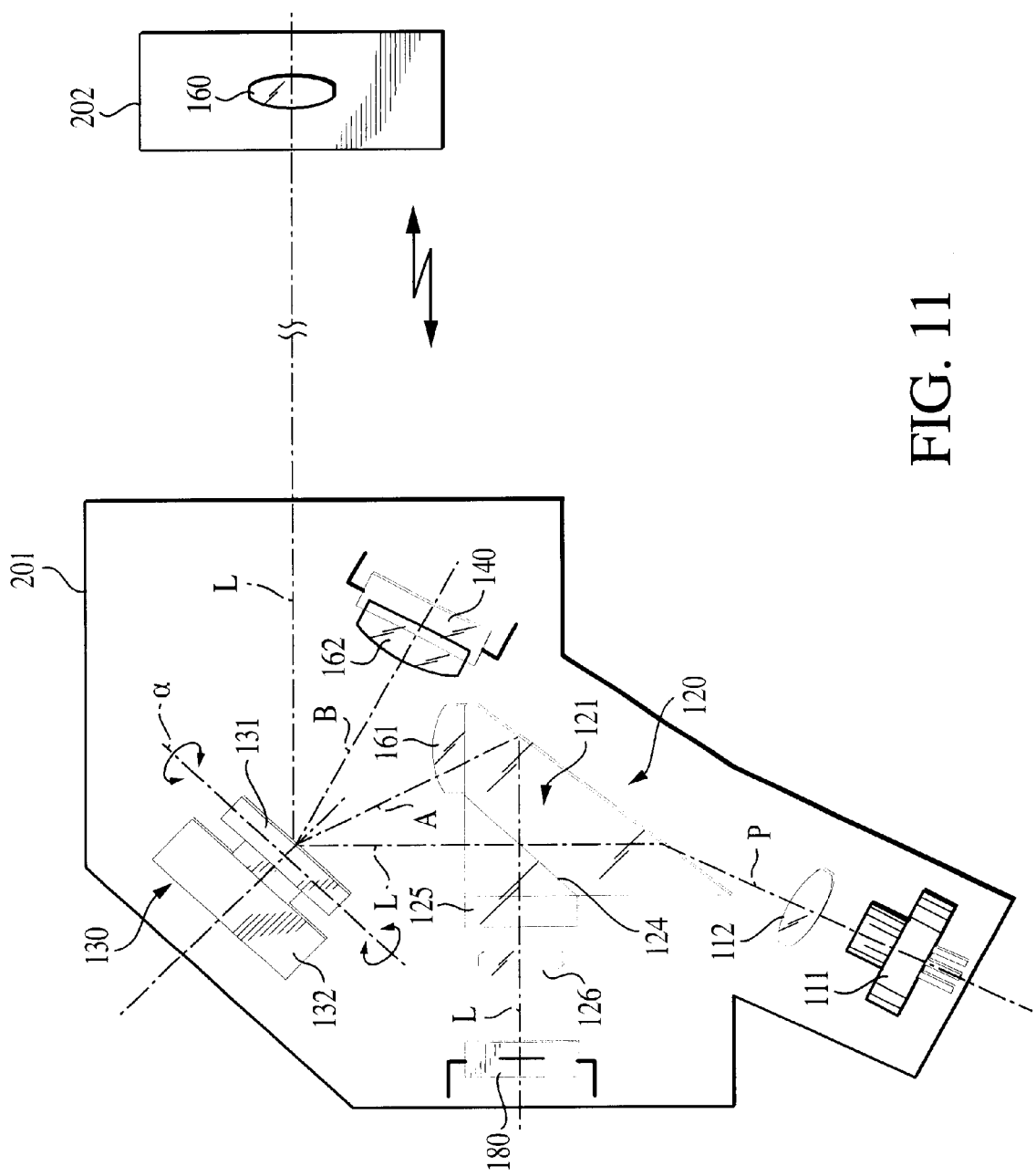
FIG. 11 is a plan view of the optical system according to the second embodiment of the invention.
Figure 12:
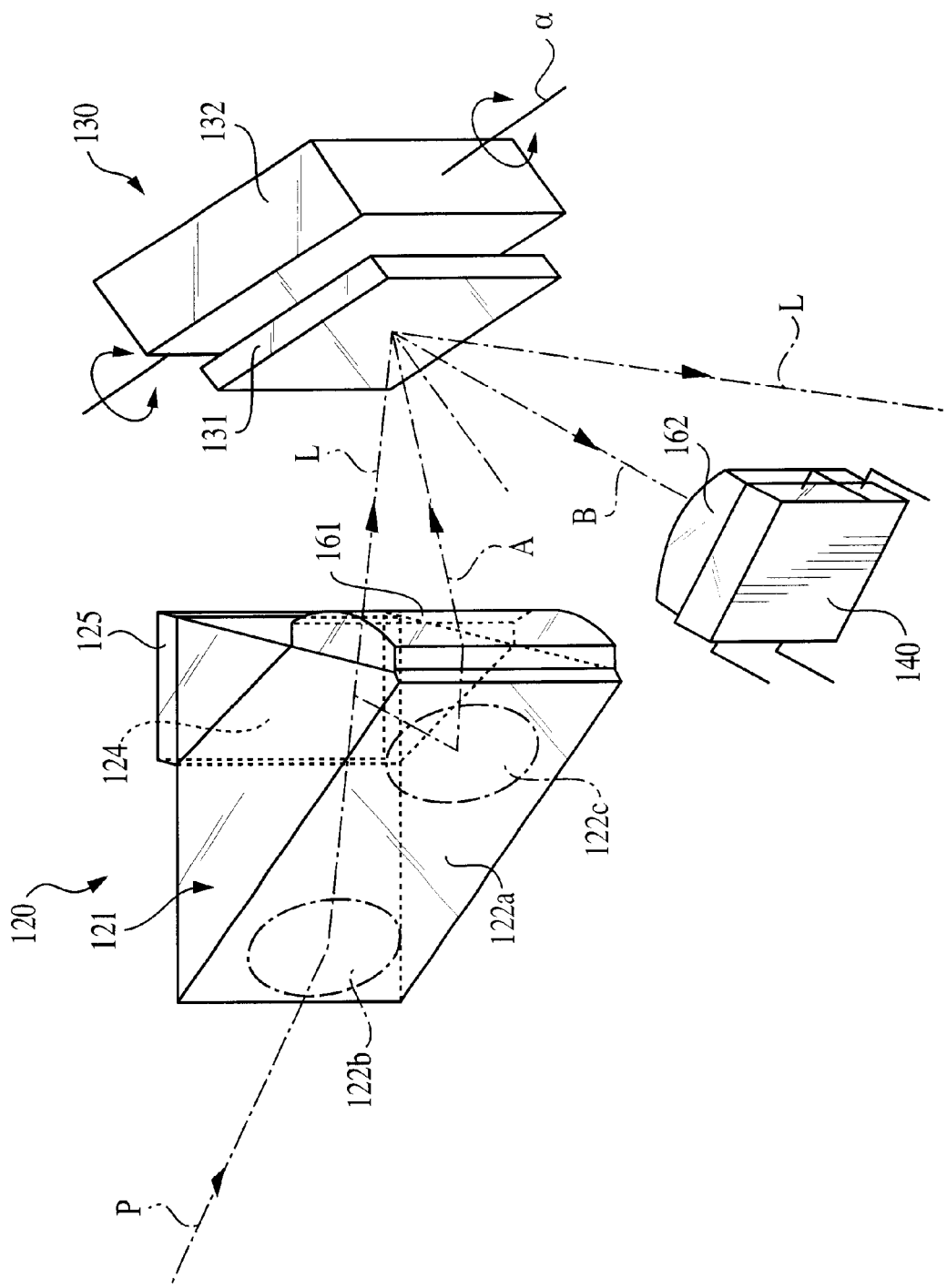
FIG. 12 is a perspective view of a rotation amount detecting system for detecting the rotation amount of a deflection mirror according to the second embodiment of the invention.

FIG. 11 is a plan view of the optical system according to the second embodiment of the invention, and FIG. 12 is an enlarged view showing a beam split prism 120, the deflection mirror unit 130 and a photo detector 140.

As shown in FIGS. 10 and 11, the laser diode 111 emits a laser beam, which is a diverging beam having an elliptical cross section, towards the collimator lens 112. The laser beam is made into a parallel light beam P by the collimator lens 112. The parallel light beam P is incident on the beam splitter 120, which is composed of the beam split prism 121, a Wollaston prism 125, and a collecting lens 126. As shown in FIG. 11, the beam P is incident on a surface, which is inclined with respect to the incident beam P, of the beam splitting prism 121, and the elliptical cross section is shaped to be a circular cross section.

The beam P incident on the beam split prism 121 is split into two beams: a first beam L to be incident on the optical disc 70; and a second beam A used for detecting the rotation amount of the deflection mirror 131. As shown in FIG. 12, a surface 122a of the beam splitting prism 120 on which the beam P is incident has a transmission area 122b on which a transmission coating for improving transmissivity is applied and a reflective area 122c on which a reflection coating is applied. The beam P passes through the transmission area 122b.

A part of the beams then passes through a beam splitting surface 124, which is formed as a half-mirror surface, emerged from the beam split prism 121, and is directed to the deflection mirror 131 as the first beam L.

The beam L is reflected by the deflection mirror surface 131, directed to the reflection prism 150, reflected thereby, and is converged on the optical disc 170 by the objective lens 160. A reflected beam L' returns the same optical path in an opposite direction and reaches the deflection mirror 131, and is incident on the beam split prism 121. The reflected beam L' is then reflected by the beam splitting surface 124, and passes through the Wollaston prism 125, which divides the incident beam into a beam for detecting a servo signal (which will be described later) and a beam for detecting a data signal. The two beams emerged from the Wollaston prism 125 pass through the collecting lens 126 and are incident on the photo sensor 180. The photo sensor 180 performs photoelectric conversion, and outputs the servo signal and the data signal in accordance with the received beams. The servo signal consists of a focusing error signal and a tracking error signal respectively representing error signals with respect target positions.

The objective lens 160 is driven by a not-shown driving device based on the focusing error signal so that the focusing condition of a beam spot formed on the optical disc 170 is adjusted. The deflection mirror 131 is driven to rotate in accordance with the tracking error signal to control a position of the beam spot on the disc 170 in the radial direction thereof.

As indicated in FIG. 10, the deflection mirror 131 is rotatable about an axis α which is parallel to the surface of the optical disc 170. When the deflection mirror 131 rotates, the beam L directed from the deflection mirror 31 to the reflection prism 150 is deflected. A plane defined by the beam L incident on the reflection prism 150 and a beam L' reflected thereby is substantially perpendicular to the surface of the optical disc 170. Further, a line which is formed where the plane defined by the beam L incident on the reflection prism 150 and the beam L' reflected thereby intersects the optical disc 170 extends in the radial direction of the optical disc 170. Accordingly, the beam incident on the objective lens 160 is deflected substantially in a radial direction of the optical disc 170 when the deflection mirror 131 is rotated.

A part of the beam reflected by the beam splitting surface 124 is further reflected by the reflection area 122c, passed through the cylindrical lens 161, and is directed to the deflecting surface 31 as the second beam A. The first cylindrical lens 161 has a power only in a direction parallel to the axis α. Thus, similarly to the first embodiment, the first beam L forms a circular spot on the deflecting surface 131 and the second beam A forms a line-like spot extending in a direction perpendicular to the rotation axis α.

As shown in FIG. 11, the first beam L and the second beam A are incident on the deflecting surface 131 at different incident angles. The second beam A is reflected by the deflecting surface 131 and is incident on the photo detector 140, as a beam B, through a second cylindrical lens 162. The second cylindrical lens 162 also has a power only in a direction parallel to the rotation axis α of the deflection mirror 130. Thus, similarly to the first embodiment, a substantially a circular beam spot is formed on the photo detector 140 by the cylindrical lens 140.

Figure 13:
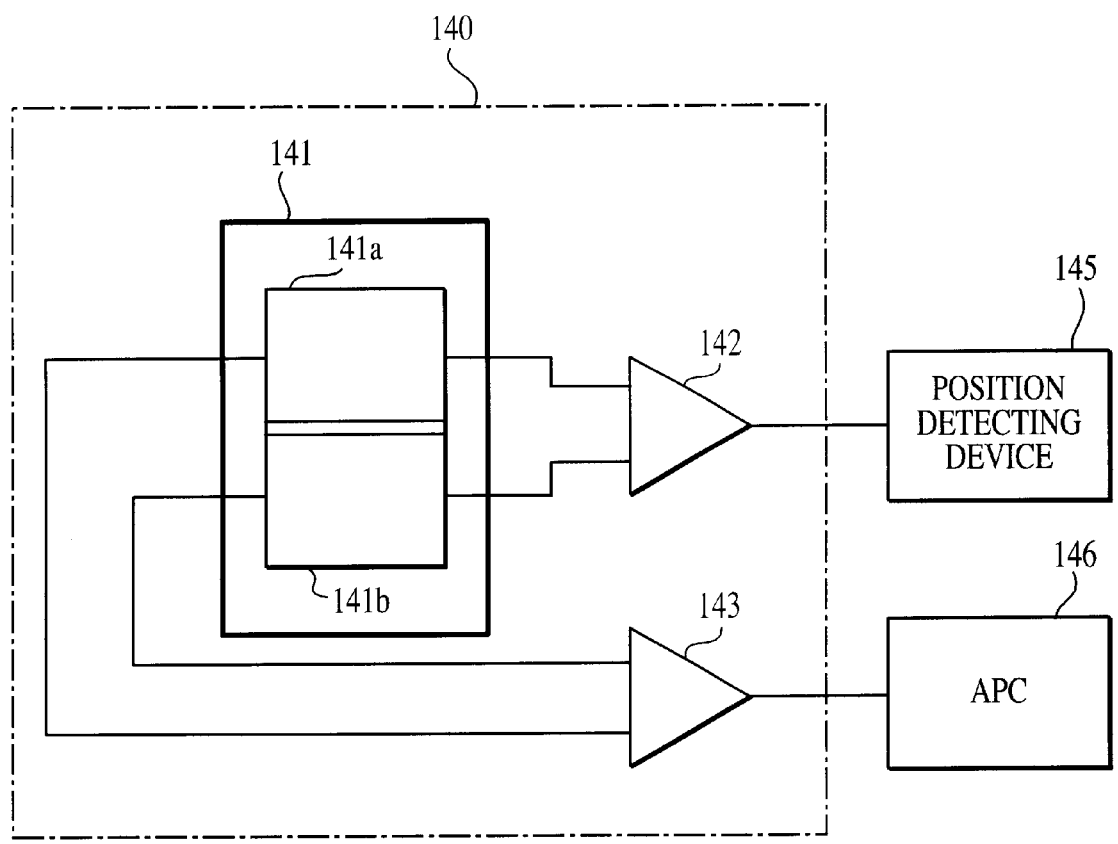
FIG. 13 shows a circuit for photo sensors of the rotation amount detecting system shown in FIG. 12.

FIG. 13 is a diagram illustrating a circuit for the photo detector 140. In the circuit, a photodiode 141 has two separate light receiving areas: a first area 141a; and a second area 141b. The first and second areas 141a and 141b are arranged in a direction parallel to the rotation axis α of the deflection mirror 131. The photodiode 141 outputs a first and a second signals representing the amounts of light received by the first and the second areas 141a and 141b. In this embodiment, the first and second areas 141a and 141b are positioned such that when the deflection mirror 131 is positioned at its neutral position, the first and second areas 41a and 41b receive the same amount of light.

As shown in FIG. 13, the first and second areas 141a and 141b are connected to a differential amplifier 142, and an adder 143, respectively. Thus, a signal representing difference of the amounts of light incident on the first and second areas 141a and 141b is output from the differential amplifier 142, and a signal representing the amount of the second beam A is output from the adder 143.

The differential amplifier 142 is connected to a position detecting device (e.g., a CPU) 145 which detects the rotating position (or angle) of the deflection mirror 131 in accordance with the output of the differential amplifier 142.

The adder 143 is connected to an APC (automatic power control) unit 146. The output of the adder 143 represent the amount of light of the beam A which is proportional to the amount of light emitted by the laser diode 111. Therefore, based on the output of the adder 143, the APC unit 146 controls the amount of light emitted by the laser diode 111.

Figure 14:
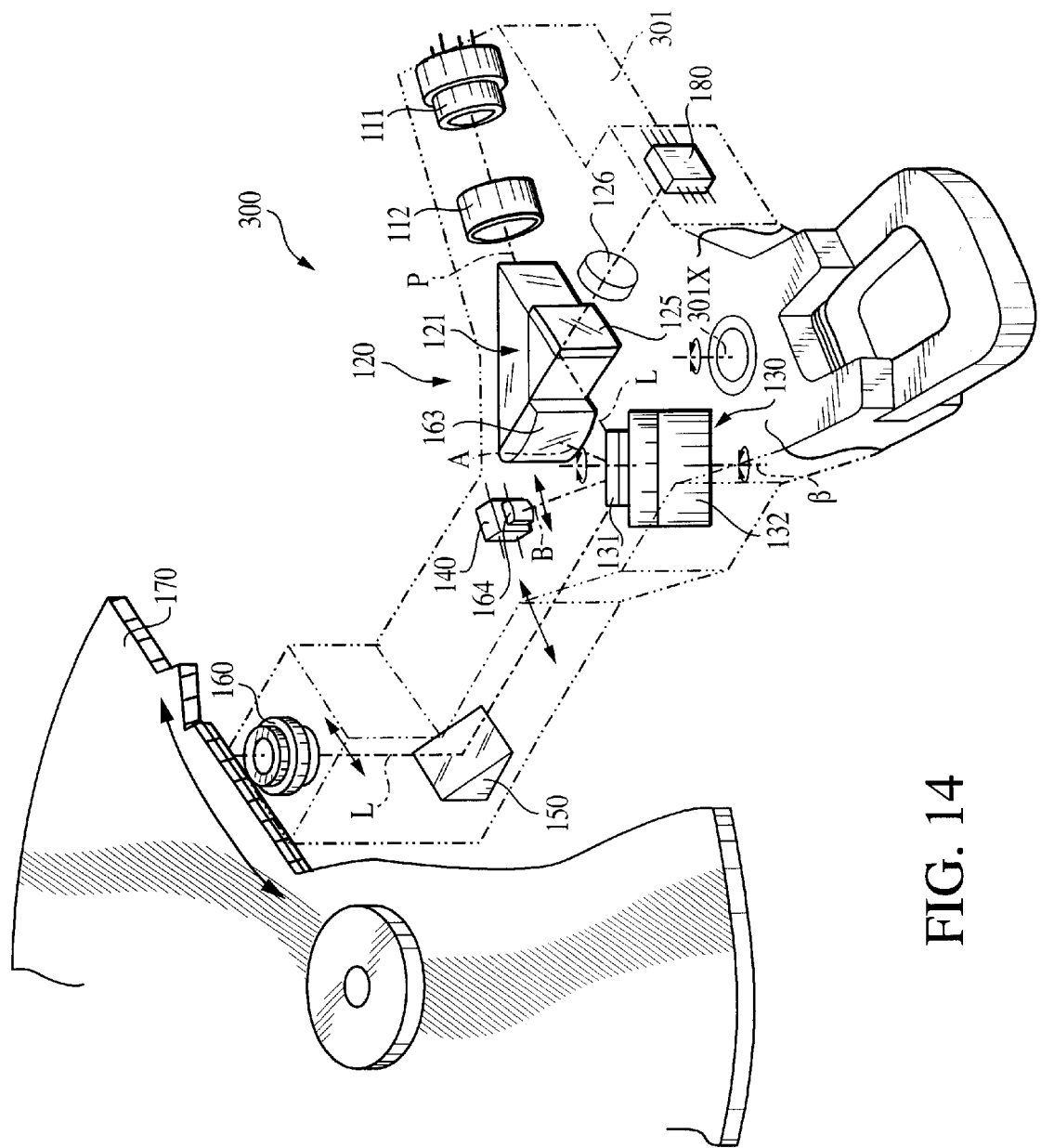
FIG. 14 is a plan view of the optical system according to a third embodiment of the invention.
Figure 15:
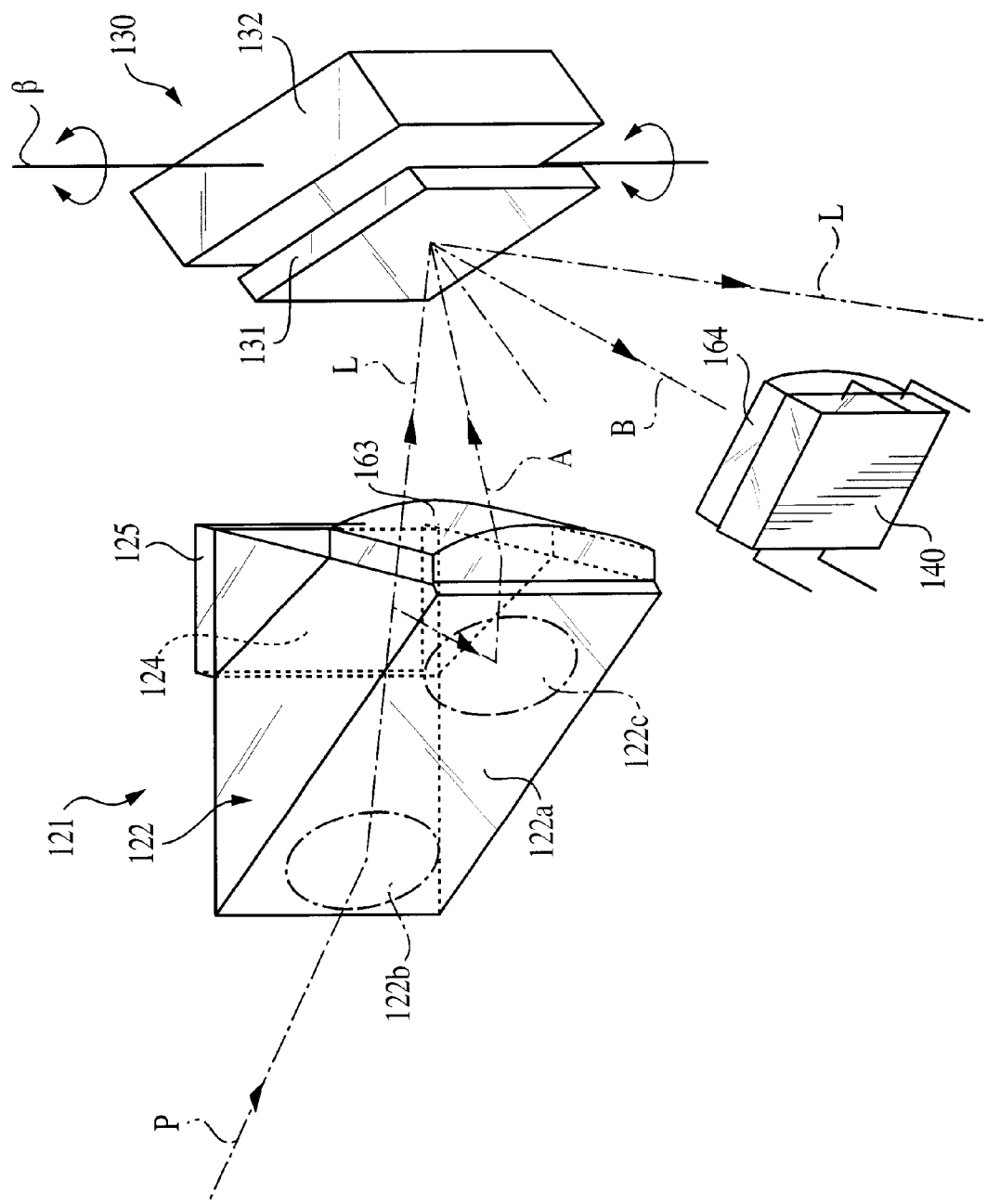
FIG. 15 is a perspective view of a rotation amount detecting system for detecting the rotation amount of a deflection mirror according to the third embodiment of the invention.

FIGS. 14 and 15 shows a perspective view of the optical system 300 according to the third embodiment of the invention. In the drawing, the same reference numerals are assigned to the elements similar to those employed in the second embodiment.

In the third embodiment, the optical system 300 is mounted on a rotatable unit 301. The rotatable unit 301 is made rotatable about an axis 301X which is perpendicular to the surface of the optical disc 170 such that the beam spot on the optical disc 170 moves substantially in the radial direction as the rotatable unit 301 rotates. In the optical system 300, the deflection mirror 131 is arranged to be rotatable about an axis β which is perpendicular to the surface of the optical disc 170.

As shown in FIG. 14, the first beam L, which is reflected by the reflection prism 150 and incident on the objective lens 160, is deflected in the radial direction of the optical disc 170, i.e., in a direction parallel to the axis 301X.

Further, instead of the first and second cylindrical lenses of the second embodiment, a third and fourth cylindrical prisms 163 and 164 are provided. The third and fourth cylindrical lenses 163 and 164 have power only in a direction parallel to the rotation axis β. Thus, also in this embodiment, the laser beam A for detecting the rotation amount of the deflection mirror 131 forms a line-like image extending in a direction perpendicular to the rotation axis β of the deflection mirror 131.

Thus, the beam A which is converged in the direction parallel to the rotation axis β of the deflection mirror 131 is reflected by the deflection mirror 131, and incident on the fourth cylindrical lens 164. The photo detector 140 for detecting the rotating position of the deflection mirror 131 has a first and second areas which are arranged along a direction parallel to the surface of the optical disc 170. When the deflection mirror 131 is located at its neutral position, the center of the beam A intersects the boundary between the first and second light receiving areas, i.e., the first and second light receiving areas receive the same amount of light. The output signals of the first and second light receiving areas of the photo detector 145 are processed in a manner similar to the second embodiment, and the rotation angle of the deflection mirror 131 is detected.

According to the second and third embodiments, the light beam emitted by the laser diode 111 is commonly used for reading/writing data and for detecting the rotation amount of the deflection mirror 131. Further, the output of the photo detector 140 can be used also for adjusting the intensity of the laser beam emitted by the laser diode 111. Accordingly, the optical system can be made compact, and the manufacturing cost will be suppressed.

It should be noted that, since the control system shown in FIG. 16 can be modified for the second or third embodiment, drawing and description thereof will be omitted.

The present disclosure relates to the subject matter contained in Japanese Patent Application No. HEI 09-309858, filed on Oct. 24, 1997, which is expressly incorporated herein by reference in its entirety.

What is claimed is:

1. A rotation amount detecting system for detecting a rotation amount of a deflection mirror rotatable about a rotation axis, said deflection mirror employed in an optical disc drive, said system comprising:

a light emitting system that emits a light beam to said deflection mirror, said light beam having, in a vicinity of said deflection mirror, a line-like cross section extending in a direction perpendicular to said rotation axis; and a detecting system that directly receives the beam reflected by said deflection mirror and determines the rotation amount of said deflection mirror in accordance with the received beam.

2. The rotation amount detecting system according to claim 1, including:

a light source that emits the light beam; and a first lens system provided between said light source and said deflection mirror, said first lens system having a power at least in a direction parallel to said rotation axis of said deflection mirror.

3. The rotation amount detecting system according to claim 2, wherein said light source emits a diverging beam.

4. The rotation amount detecting system according to claim 3, wherein said first lens system converges said light beam at a position in a vicinity of a reflection surface of said deflection mirror.

5. The rotation amount detecting system according to claim 4, wherein said first lens system converts said diverging beam into a parallel beam in a direction which is perpendicular to said rotation axis of said deflection mirror.

6. The rotation amount detecting system according to claim 4, wherein said light source includes an LED.

7. The rotation amount detecting system according to claim 4, wherein said first lens system includes an anamorphic lens.

8. The rotation amount detecting system according to claim 2, wherein said light source emits a parallel light beam.

9. The rotation amount detecting system according to claim 8, wherein said first lens system has a power only in a direction parallel to the rotation axis of said deflection mirror.

10. The rotation amount detecting system according to claim 9, wherein said first lens system includes a cylindrical lens.

11. The rotation amount detecting system according to claim 2,
wherein said light source includes a light source of said optical disc drive which emits a beam to be directed to the optical disc, and
wherein said light emitting system further comprises a beam splitter which splits the light beam emitted by said light source of said optical disc drive into a first beam to be directed to said optical disc and a second beam to be directed to said detecting system.

12. The rotation amount detecting system according to claim 11,
wherein said first beam is directed to said optical disc after being deflected by said deflection mirror, and
said second beam is directed to said detection system after being deflected by said deflection mirror.

13. The rotation amount detecting system according to claim 1, wherein said detecting system comprising a photo sensor having at least two light receiving areas arranged in a direction in which the received beam moves when said deflection mirror is rotated.

14. The rotation amount detecting system according to claim 13, wherein said detection system includes a second lens system that forms a substantially circular beam spot over said at least two light receiving areas.

15. The rotation amount detecting system according to claim 14, wherein said detecting system detects the rotation amount of said deflection mirror in accordance with a difference between an amount of light detected by each of said at least two light receiving areas.

16. The rotation amount detecting system according to claim 14, wherein said detecting system detects an intensity of the light beam emitted by said light source in accordance with a sum of the amount of light detected by said two light receiving areas.

17. The rotation amount detection system according to claim 1, said light beam being incident onto said deflection mirror without being reflected by an optical disc.

* * * * *